United States Patent [19]
Béer et al.

[11] Patent Number: 5,636,510
[45] Date of Patent: Jun. 10, 1997

[54] GAS TURBINE TOPPING COMBUSTOR

[75] Inventors: János Béer, Winchester, Mass.;
Thomas E. Dowdy, Orlando, Fla.;
Dennis M. Bachovchin, Delmont, Pa.

[73] Assignee: Westinghouse Electric Corporation, Pittsburgh, Pa.

[21] Appl. No.: 248,742

[22] Filed: May 25, 1994

[51] Int. Cl.$^6$ ............................. F23R 3/26; F23R 3/32
[52] U.S. Cl. ..................... 60/39.23; 60/737; 60/742; 60/748
[58] Field of Search ..................... 60/39.23, 737, 60/742, 748, 749; 239/400, 405, 406

[56] References Cited

U.S. PATENT DOCUMENTS

| | | | |
|---|---|---|---|
| 2,687,010 | 8/1954 | Ellis . | |
| 2,850,875 | 9/1958 | Gahwyler . | |
| 3,030,773 | 4/1962 | Johnson . | |
| 3,490,230 | 1/1970 | Pillsbury et al. | 60/748 |
| 3,703,259 | 11/1972 | Sturgess et al. | 60/748 |
| 3,811,278 | 5/1974 | Taylor et al. | 60/748 |
| 3,958,413 | 5/1976 | Cornelius et al. . | |
| 3,972,182 | 8/1976 | Salvi | 60/748 |
| 4,100,733 | 7/1978 | Striebel et al. | 60/39.74 |
| 4,155,220 | 5/1979 | Emory | 239/406 |
| 4,198,815 | 4/1980 | Bobo et al. | 239/406 |

(List continued on next page.)

FOREIGN PATENT DOCUMENTS

| | | |
|---|---|---|
| 0500256 | 8/1992 | European Pat. Off. . |
| 1-63721 | 3/1989 | Japan . |
| 2-93210 | 4/1990 | Japan . |
| 2-183720 | 7/1990 | Japan . |
| 260402 | 7/1949 | Switzerland . |
| 695342 | 8/1953 | United Kingdom . |
| 2045422 | 10/1980 | United Kingdom . |
| 2146425 | 4/1985 | United Kingdom . |
| 2175684 | 12/1986 | United Kingdom . |

OTHER PUBLICATIONS

Patent Abstracts of Japan, vol. 9, No. 135 (M–386), Jun. 1985 & Japan 60 017634 (Hitachi Seisakushi KK), Jan. 1985.

Westinghouse Electric Corporation, "Second Generation PFBC Systems Research & Development Phase 2 Topping Combustor Development," Proceedings of the Coal–Fired Power Systems 93 —Advances in IGCC and PFBC Review Meeting, Jun. 1993.

Domeracki et al., "Topping Combustor Development for Second Generation Pressurized Fluidized Bed Combined Cycles," submitted to ASME on Jan. 24, 1994 for subsequent publication.

Westinghouse Electric Corporation, "Topping Combustor Development for Second Generation PFBC Power Plants," Status Report, Dec. 1992.

Westinghouse Electric Corporation, "Second Generation PFBC System Research & Development Phase 2 Topping Combustor Development," Status Report, Dec. 1992.

Robertson et al., "Second Generation Pressurized Fluidized Bed Combustion Plant Conceptual Design and Optimization of a Second–Generation PFB Combustion Plant," Phase I Task I Report —vol. 1, Sep. 1989.

*Primary Examiner*—Timothy S. Thorpe
*Attorney, Agent, or Firm*—M. G. Panian

[57] ABSTRACT

A combustor for burning a mixture of fuel and air in a rich combustion zone, in which the fuel bound nitrogen in converted to molecular nitrogen. The fuel rich combustion is followed by lean combustion. The products of combustion from the lean combustion are rapidly quenched so as to convert the fuel bound nitrogen to molecular nitrogen without forming NOx. The combustor has an air radial swirler that directs the air radially inward while swirling it in the circumferential direction and a radial fuel swirler that directs the fuel radially outward while swirling it in the same circumferential direction, thereby promoting vigorous mixing of the fuel and air. The air inlet has a variable flow area that is responsive to variations in the heating value of the fuel, which may be a coal-derived fuel gas. A diverging passage in the combustor in front of a bluff body causes the fuel/air mixture to recirculate with the rich combustion zone.

19 Claims, 6 Drawing Sheets

U.S. PATENT DOCUMENTS

| | | | |
|---|---|---|---|
| 4,271,675 | 6/1981 | Jones et al. | 60/737 |
| 4,408,461 | 10/1983 | Brühwiler et al. | 60/737 |
| 4,425,755 | 1/1984 | Hughes | 60/742 |
| 4,539,918 | 9/1985 | Beér et al. | 110/266 |
| 4,598,553 | 7/1986 | Saito et al. | 60/733 |
| 4,825,658 | 5/1989 | Beebe | 60/748 |
| 4,845,940 | 7/1989 | Beér | 60/732 |
| 5,235,814 | 8/1993 | Leonard | 60/738 |
| 5,444,982 | 8/1995 | Heberling et al. | 60/737 |

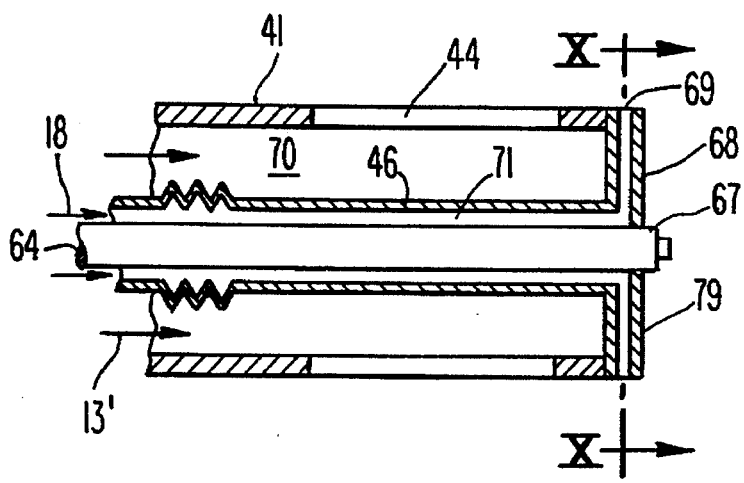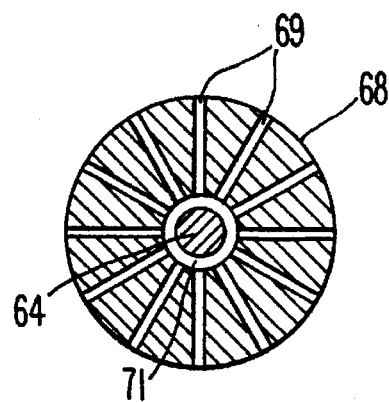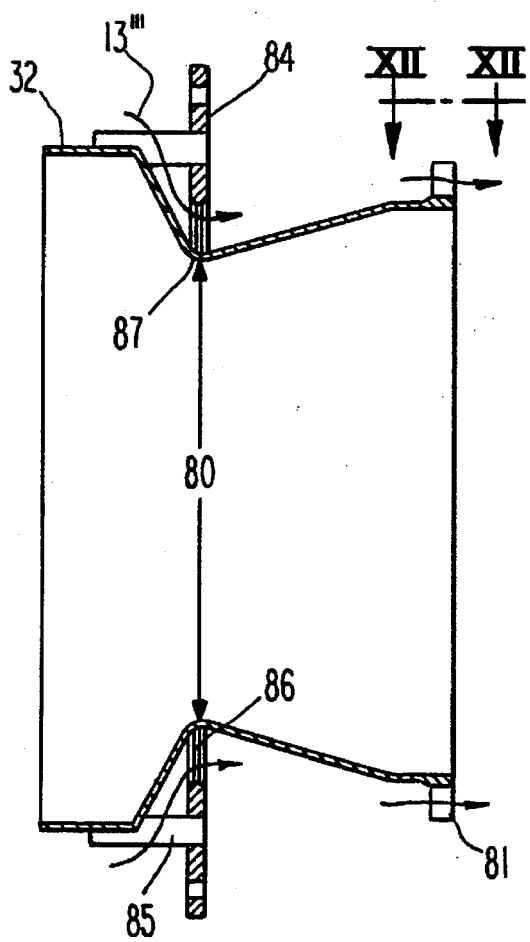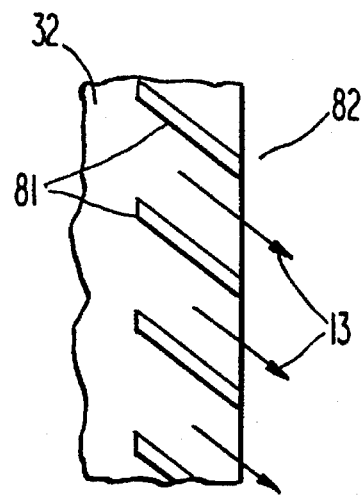

GAS TURBINE TOPPING COMBUSTOR

REFERENCE TO GOVERNMENT CONTRACTS

Development for this invention was supported in part by U.S. Department of Energy contract DE-AC21-86MC21023. Accordingly, the United States government may have certain rights in the invention.

BACKGROUND OF THE INVENTION

The present invention relates to a low NOx combustor for a gas turbine based power plant. More specifically, the present invention relates to a combustor for burning a hot coal-derived fuel gas in an gas turbine based power plant.

The high efficiency, low capital cost and short lead time of gas turbine based power plants make them particularly attractive to electric utilities as a means of producing electrical power. Unfortunately, traditionally, gas turbines have been limited to operation on expensive, sometimes scarce, fuels—chiefly, distillate oil and natural gas. As a result of the ready availability and low cost of coal, considerable effort has been expended toward developing a gas turbine system for generating electrical power that can utilize coal as its primary fuel.

Several approaches have been developed toward accomplishing this end. One approach utilizes what is often referred to as "first generation" pressurized fluidized bed combustion. According to this approach, compressed air from a gas turbine compressor is used to fluidize coal in a pressurized fluidized bed combustor ("PFBC") and the resulting hot gas is expanded in a turbine to produce power. Unfortunately, the thermodynamic efficiency of this approach is poor due to the need to limit the bed temperature and, hence, the temperature of the air entering the turbine, to approximately 870° C. (1600° F.) in order to optimize the capture of the sulfur in the coal and avoid the carryover of harmful alkali vapors into the turbine. This is in contrast to modern conventional gas or liquid fuel fired gas turbines, which can operate with turbine inlet gas temperatures in excess of 1425° C. (2600° F.). As is well known in the art, increasing the temperature of the gas entering the turbine section increases the power output and efficiency of the gas turbine.

Therefore, in a second a approach, often referred to as a "second generation" pressurized fluidized bed combustion, a portion of the compressed air from the compressor is used to generate a low heating value fuel gas in a gasifier. This low heating value fuel gas is then combusted in a topping combustor, thereby achieving the optimum hot gas temperature for expansion in the turbine. A second portion of the air from the compressor is used to fluidize coal, or char from the gasifier, in the PFBC. The vitiated hot air discharged from a PFBC is then directed to the topping combustor where it serves as combustion air for the low heating value fuel gas.

In still another approach, often referred to as an "integrated gasified combined cycle" ("IGCC") power plant, a portion of the compressed air is used to generate a fuel gas in a gasifier, which is then burned in a topping combustor, as discussed above. However, a PFBC is not utilized and the compressed air not utilized in the gasifier is sent directly to the topping combustor.

Although the use of a topping combustor in the second generation fluidized bed combustion and IGCC processes improves thermodynamic performance, the combustion of the fuel gas can result in the formation of nitrogen oxides ("NOx"), which are considered atmospheric pollutants.

Accordingly, it would be desirable to provide a combustor capable of combusting a fuel while generating a minimum of NOx.

SUMMARY OF THE INVENTION

Accordingly, it is the general object of the current invention to provide a combustor capable of combusting a fuel while generating a minimum of NOx. It is a further object of the current invention to provide an improved fuel injection system for use in a multiple annular swirl type combustor, such as that disclosed in U.S. Pat. No. 4,845,940 (Beer).

Briefly, these objects, as well as other objects of the current invention, are accomplished in a combustor for producing a hot compressed gas that comprises (i) an air inlet for receiving a flow of compressed air and (ii) means for mixing a flow of a first fuel into the flow of compressed air, thereby producing a fuel/air mixture. The fuel and air mixing means includes (i) first swirling means for directing the flow of the first fuel in a first direction, the first direction forming a first acute angle with a first radial direction, and (ii) second swirling means for directing the flow of compressed air in a second direction, the second direction forming a second acute angle with a second radial direction, the second radial direction being opposite the first radial direction.

In one embodiment of the current invention, the combustor has a cavity disposed therein that forms a zone in which the fuel/air mixture is ignited. In this embodiment, the combustor further comprises means for recirculating the burned gas through the ignition zone. The recirculating means comprises a diverging passage, swirling flow and a bluff body.

BRIEF DESCRIPTION OF THE DRAWINGS

FIG. 9 is a longitudinal cross-section through the radial fuel swirler and fuel nozzle shown in FIG. 4.

FIG. 10 is a cross-section taken through line X—X shown in FIG. 9.

FIG. 11 is a detailed view of the middle liner shown in FIG. 2.

FIG. 12 is a view taken from line XII—XII shown in FIG. 11.

DESCRIPTION OF THE PREFERRED EMBODIMENT

Figure 1:
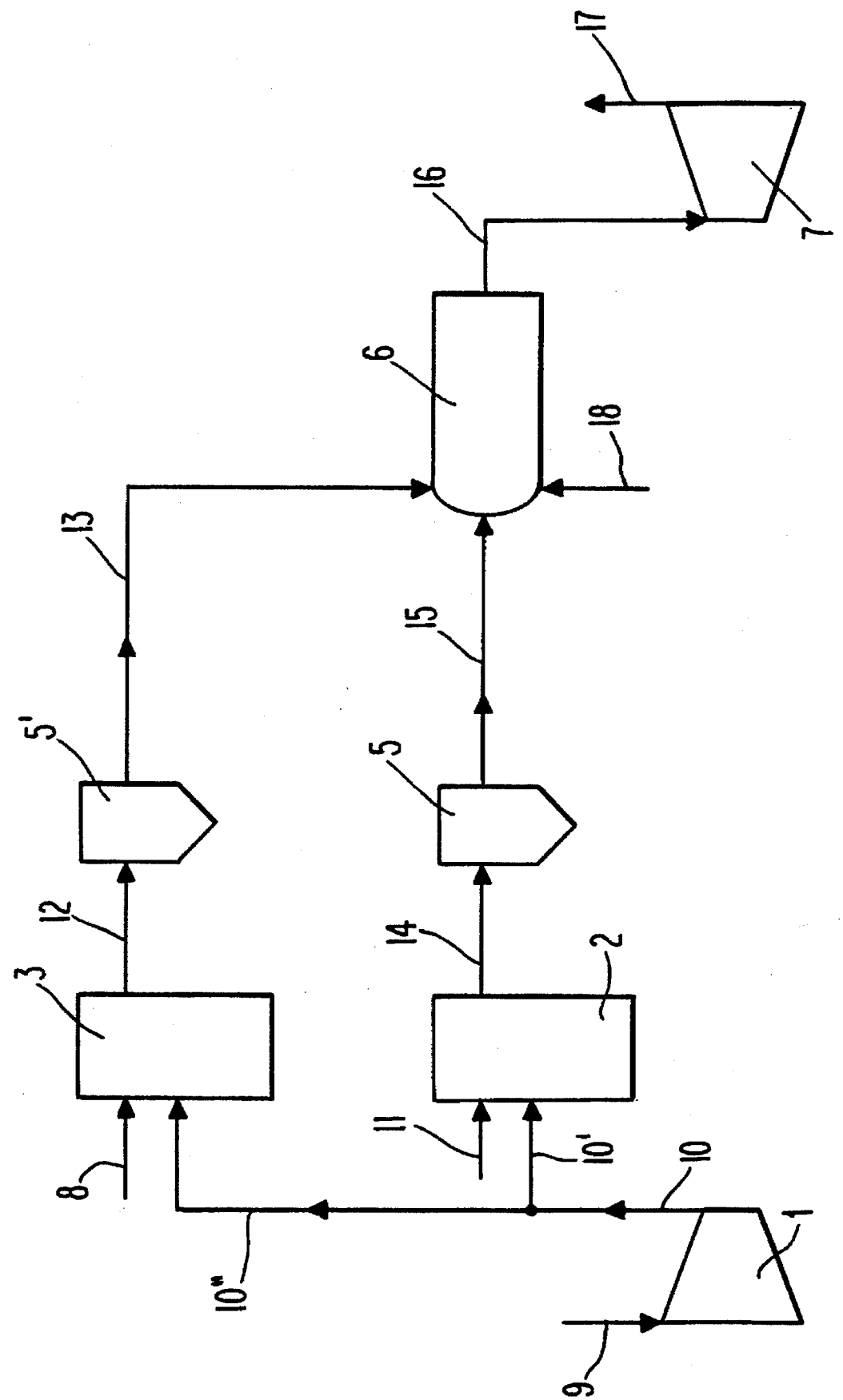
FIG. 1 is a schematic diagram of a second generation pressurized fluidized bed combustion gas turbine based power plant utilizing the topping combustor of the current invention.

Referring to the drawings, there is shown in FIG. 1 a schematic diagram of an second generation pressurized fluidized bed combustion gas turbine based power plant. The plant comprises a compressor 1 that inducts ambient air 9 and produces high pressure air 10 that is typically at a temperature in the range of 370°–425° C. (700°–800° F.). A first portion 10' of the compressed air 10, is directed, via piping, to a gasifier 2 where it is used to gasify coal 11.

The gasifier 2 produces a low heating value coal-derived fuel gas 14 typically having a heating value in the range of 100 to 200 BTU/SCF and a temperature of approximately 870° C. (1600° F.). In addition, the fuel gas 14 is laden with particulates (chiefly coal slag and ash), as well as sulfur species (chiefly hydrogen sulfide and COS), alkali species, and nitrogen bearing compounds (chiefly ammonia). From the gasifier 2, the fuel gas 14 is passed through a gas cleanup system 5, which typically removes at least a portion of the particulate matter and sulfur species.

A second portion 10" of the compressed air 10 is directed, via piping, to a PFBC 3 supplied with a char 8 produced by the gasifier 2. Alternatively, the PFBC 3 may be operated on coal. In any case, the compressed air 10" is used to fluidize the char 8 or coal, which is then combusted so as to produce hot vitiated compressed air 12. In the preferred embodiment, approximately 80% of the compressed air 10 is directed to the PFBC 3 and 20% is directed to the gasifier 2. The hot vitiated compressed air 12 is at a temperature of approximately 870° C. (1600° F.) and has an oxygen content in the range of approximately 10–15%, thereby making it suitable for use as pre-heated combustion air. From the PFBC 3, the hot vitiated compressed air 12 is directed to a gas cleanup system 5' for removal of particulates and sulfur species.

As shown in FIG. 1, the fuel gas 15 from the gas cleanup system 5 and the hot vitiated compressed air 13 from the gas cleanup system 5' are each directed, via piping, to a topping combustor 6 where the fuel gas 15 is burned in the compressed vitiated air 13. A supplemental fuel 18, which may be a high heating value fuel—such as natural gas or propane—may also be burned in the combustor 6. The capability of burning supplemental fuel 18 is desirable since the supplemental fuel can be used to (i) achieve gas turbine turn-down by fuel flow adjustment, which is desirable because the production of fuel gas in the gasifier is not readily changed, (ii) start-up the plant, or (iii) operate the plant when the gasifier is out of service.

From the topping combustor 6, the hot compressed gas 16 is expanded in a turbine 7, thereby producing power for driving an electrical generator (not shown). Depending on the capability of the turbine 7, the temperature of the hot compressed gas 16 may be as high as 1425° C. (2600° F.) or higher. The expanded gas 17 discharged from the turbine 7 is then exhausted to atmosphere.

During combustion, NOx is generated primarily from two sources—(i) the conversion of atmospheric nitrogen in the combustion air to NOx and (ii) the conversion of organically bound nitrogen compounds, such as $HN_3$ (ammonia) and HCN, in the fuel to NOx. The rate of formation of NOx from atmospheric nitrogen is primarily dependent upon temperature, occurring only at temperatures in excess of approximately 1325° C. (2400° F.) in fuel lean mixtures. Therefore, NOx generated from atmospheric nitrogen is typically referred to as "thermal NOx." The rate of formation of NOx from fuel bound nitrogen, on the other hand, is dependent primarily on the local fuel-air ratio and, to a lesser extent, on temperature.

A significant quantity of the nitrogen that was bound in the coal 11 appears in the fuel gas 15. Therefore, combustion of the fuel gas 15 will result in the formation of NOx from both the fuel and the combustion air. However, as discussed in U.S. Pat. No. 4,845,940 (Beer), hereby incorporated by reference in its entirety, NOx generation can be minimized by first pyrolyzing the fuel in a fuel rich environment at a sufficient temperature and for a sufficient time to convert the fuel bound nitrogen to molecular nitrogen, but without sufficient oxygen to oxidize the nitrogen compounds in the fuel into NOx.

Subsequently, the products of this fuel rich combustion are further combusted by introducing sufficient additional air into the fuel/air mixture to create a lean fuel/air mixture that ensures complete combustion of CO and any unburned hydrocarbons. Due to the presence of the excess oxygen and the fact that the temperature associated with this subsequent combustion is in the range that favors the formation of thermal NOx, given sufficient time the thermal NOx reaction will occur. However, the products of this further combustion are rapidly quenched to a temperature below that at which thermal NOx will occur—i.e., below approximately 1325° C. (2400° F.). This quenching is accomplished by the addition of still more combustion air and is preformed with sufficient rapidity to ensure that the residence time of the molecular nitrogen is too short to allow significant conversation to NOx.

The current invention concerns the topping combustor 6 that allows the fuel gas 15 to be combusted with only a minimum amount of NOx generation based on the combustion principles discussed above. Preferably, according to the current invention, the combustor 6 is a multiple annular swirl combustor of the type disclosed in the aforementioned U.S. Pat. No. 4,845,940 (Beer) into which an improved fuel injection system, discussed more fully below, has been incorporated.

Figure 2:
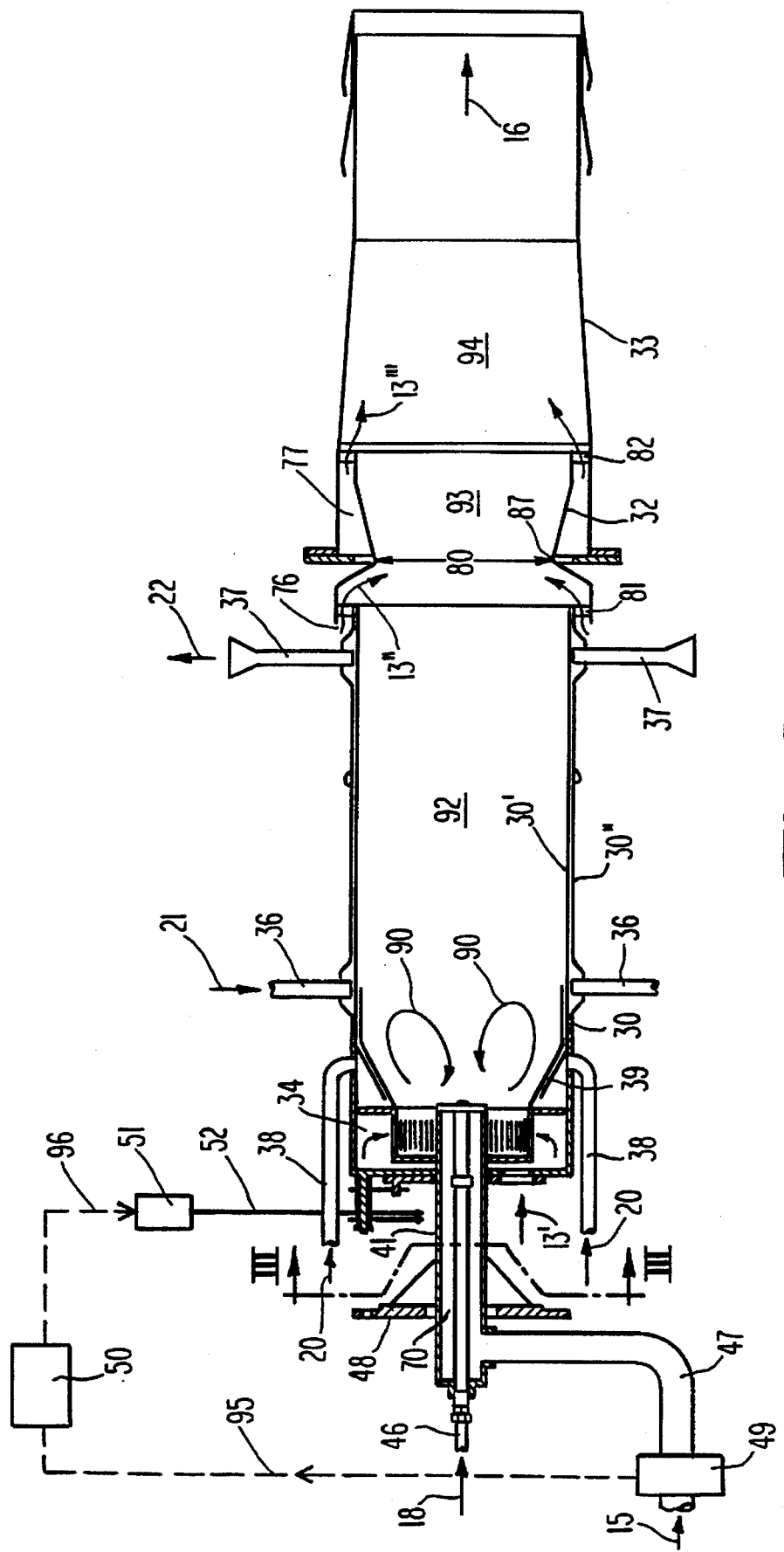
FIG. 2 is a longitudinal cross-section through the combustor shown in FIG. 1.

Accordingly, as shown in FIG. 2, the combustor 6 is comprised of a cylindrical liner 30 that forms the forward portion of the combustor, an approximately cylindrical liner 32 that forms the mid-section of the combustor, and an approximately cylindrical liner 33 that forms the aft section of the combustor.

The forward liner 30 is comprises of concentric inner and outer cylinders 30' and 30" that enclose a first combustion zone 92 and that form a narrow annular passage between themselves. Cooling air supply tubes 36 supply cooling air 21 to this annular passage for cooling of the inner liner 30'. The cooling air 21 may comprise a portion of the vitiated compressed air 13 or compressed air 10 bled directly from the compressor 1. The cooling air 22 is discharged from the annular passage by tubes 37.

The middle liner 32 encloses a second combustion zone 93. In addition, the forward liner 30 and the middle liner 32 form a first annular passage 76 between themselves. An axial swirler 81 is disposed at the outlet of the first annular passage 76 and imparts a circumferential swirl to the portion 13" of the vitiated compressed air 13 flowing therethrough.

The aft liner 33 encloses a quench zone 94. In addition, the middle liner 32 and the aft liner 33 form a second annular passage 77 between themselves. An axial swirler 82 is disposed at the outlet of the second annular passage 77 and imparts a circumferential swirl to the portion 13'" of the vitiated compressed air 13 flowing therethrough. As shown in FIGS. 11 and 12, the axial swirler 82 is formed by a plurality of vanes 87 oriented at an angle to the combustor axis and distributed around the circumference of the second annular passage 77. In the preferred embodiment, the vanes 87 are oriented at an angle of approximately 50° to the combustor axis. A similar construction is used with respect to the axial swirler 81 for the first annular passage 76.

As shown best in FIG. 11, a mounting flange 84 encircles a narrow throat 80 formed in the middle liner 32. The flange 84 is connected to the middle liner 32 by pins 85 and serves to secure the aft end of the combustor to a supporting structure (not shown). In addition, the flange 84 creates an annular passage 86 between it and the middle liner 32 through which the portion of the vitiated air 13''' flowing through the annular passage 77 must pass. Thus, the flange 84 serves as a baffle that directs the vitiated air 13''' to flow over the outer surface of the middle liner 32 with sufficient velocity to ensure adequate heat transfer, thereby preventing the inward projecting portion 87 of the middle liner 32 from becoming over-heated.

Returning to FIG. 2, a fuel injection assembly 34 is disposed upstream of the forward liner 30. A centrally disposed fuel supply pipe 46 directs the high heating value fuel 18 to the fuel injection assembly 34. A fuel gas radial swirler 41 encloses a portion of the fuel supply pipe 46 and forms an annular passage 70 therebetween. A second fuel supply pipe 47 directs the fuel gas 15 from the gasifier 2 to the fuel injection assembly 34. A bracket 48, which encircles the fuel gas radial swirler 41, facilitates mounting the fuel injection assembly to a support structure (not shown).

Figure 4:
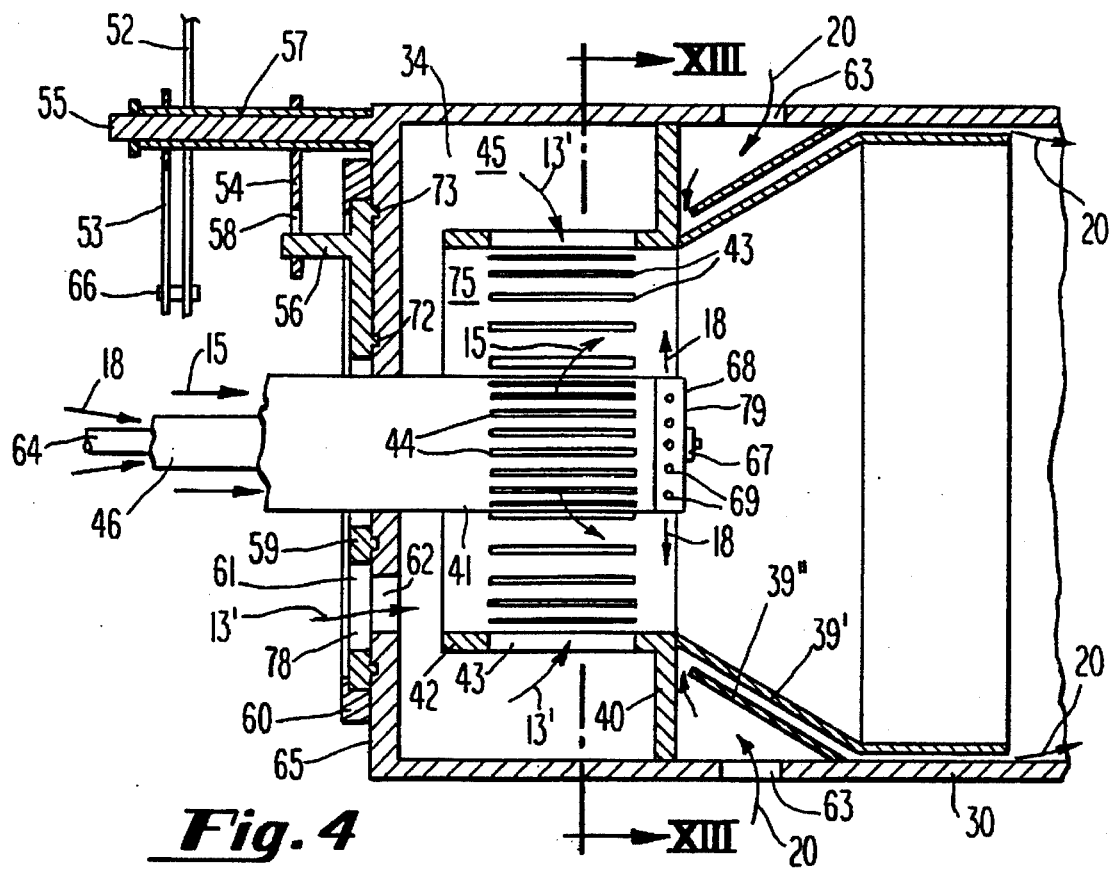
FIG. 4 is a cross-section taken through line IV—IV shown in FIG. 3.
Figure 3:
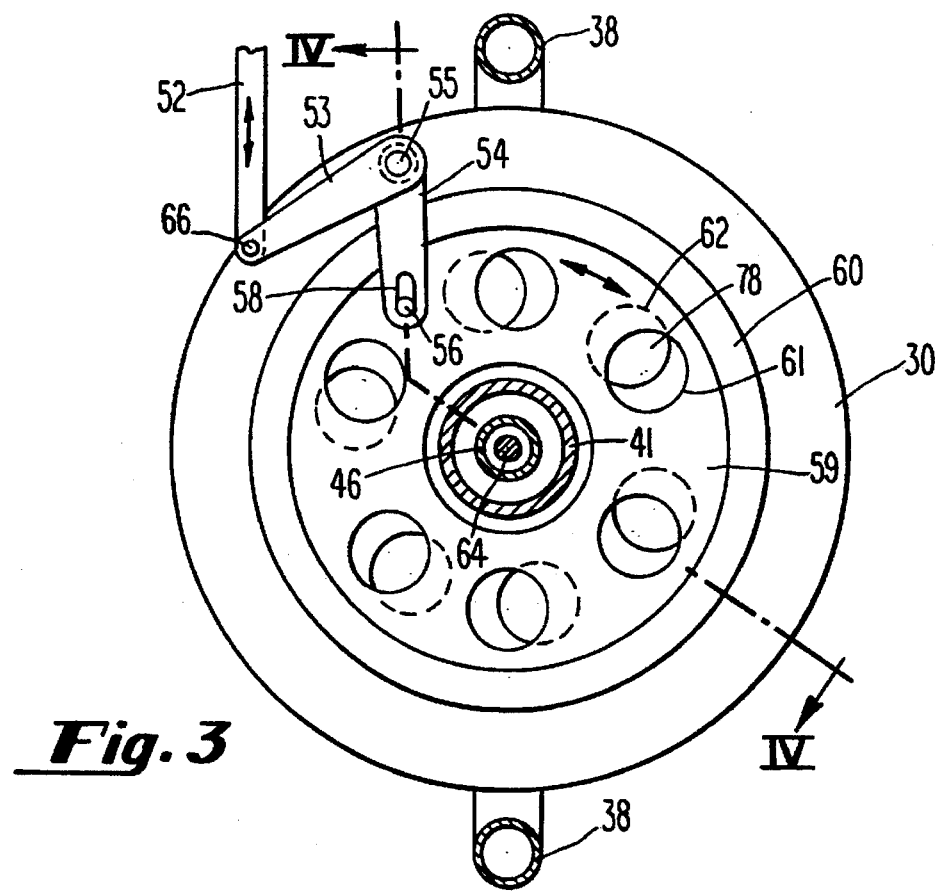
FIG. 3 is a cross-section taken through line III—III shown in FIG. 2.
Figure 14:
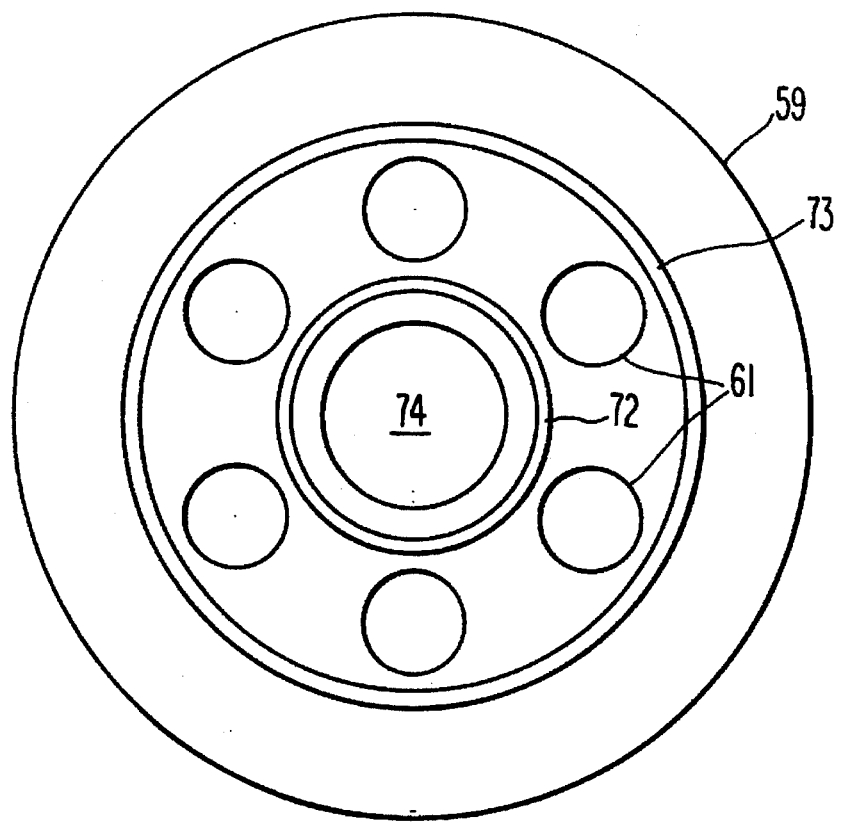
FIG. 14 is a plan view of the orifice plate shown in FIG. 4.

The fuel injection assembly 34 will now be discussed in detail. As shown in FIGS. 3 and 4, a portion 13' of the vitiated air from the PFBC 3 enters the combustor 6 via a plurality of air inlets 78 formed by passages consisting of holes 61 in an orifice plate 59 that are at least partially aligned with holes 62 in a face plate 65 attached to the forward liner 30. As shown in FIG. 14, the orifice plate 59 is circular and the holes 61 are distributed in a circular array around the plate. A centrally disposed hole 74 allows the fuel gas radial swirler 41 to extend through the orifice plate 59. Inner and outer annular projections 72 and 73 extend from one face of the orifice plate 59.

The orifice plate 59 is rotatably mounted on the face plate 65. As can be seen in FIG. 4, the annular projections 72 and 73 of the orifice plate 59 mate with annular grooves in the face plate 65, thereby maintaining the orifice plate in accurate alignment with the face plate in the radial direction while leaving the orifice plate free to rotate around the face plate. In addition, a retaining ring 60 maintains the orifice plate 59 against the face plate 65.

According to an important aspect of the current invention, the flow area of the air inlets 78 is variable. By rotating the orifice plate 59, the degree of alignment between the holes 61 in the orifice plate and the holes 62 in the face plate 65 can be varied, thereby varying the flow area of the air inlets 78 and, therefore, the flow rate of the portion 13' of the vitiated compressed air that enters the fuel injection assembly 34.

As shown in FIGS. 3 and 4, a pin 56 extends axially from the orifice plate 59 and fits within a slot 58 formed in one end of a link 54. The link 54 is fixedly attached at its other end to a sleeve 57 that is free to rotate around a pin 55 extending axially from the face plate 65. Link 53 is also fixedly attached at one of its ends to the sleeve 57. The other end of the link 53 is rotatably coupled to an actuator arm 52 by means of a pin 66. As a result of this linkage, linear motion of the actuator arm 52 (indicated by the double headed arrow in FIG. 3) causes the orifice plate 59 to rotate relative to the face plate 65.

As shown in FIG. 2, the actuator arm 52 is connected to a driver 51 that provides the force necessary to rotate the orifice plate 59. In the preferred embodiment, the driver 51 is a pneumatic cylinder that is automatically operated in response to variations in the heating value of the fuel gas 15, as discussed further below. However, a simple rack and pinion hand crank could also be utilized as the driver 51.

Figure 5:
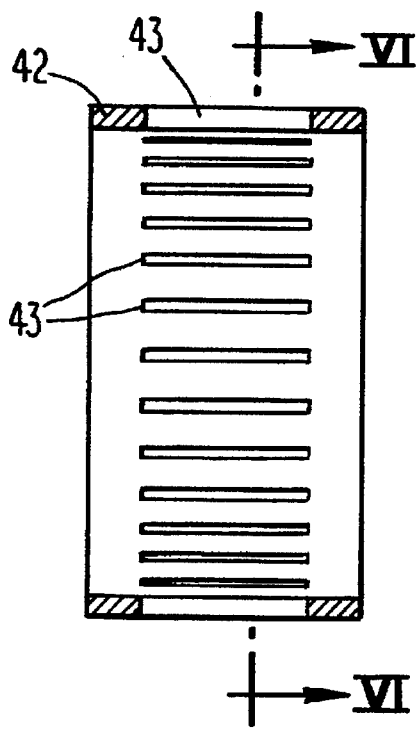
FIG. 5 is a longitudinal cross-section through the radial air swirler shown in FIG. 4.
Figure 6:
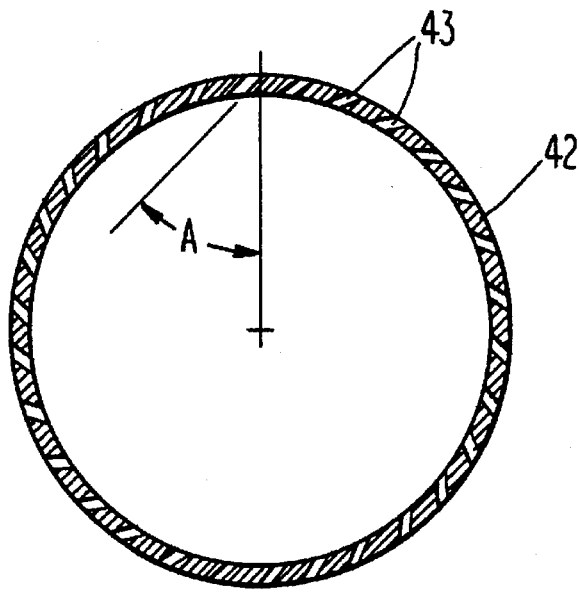
FIG. 6 is a cross-section taken through line VI—VI shown in FIG. 5.
Figure 13:
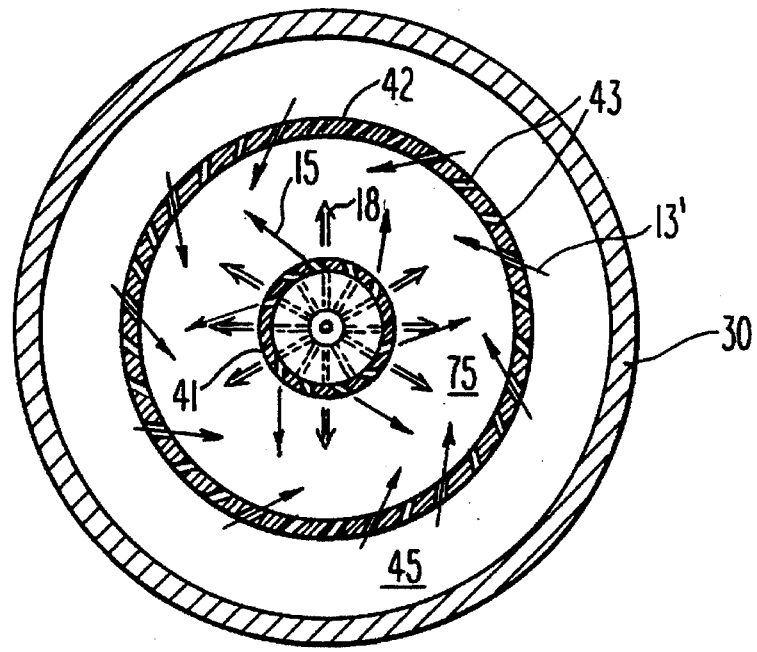
FIG. 13 is a cross-section taken through line XIII—XIII shown in FIG. 4.

As shown in FIG. 4, upon passing through the air inlets 78, the vitiated compressed air 13' enters an annular chamber 45 formed between the forward liner 30 and an air radial swirler 42. As shown in FIG. 5, the air radial swirler 42 is formed by a cylindrical member around which a plurality of axially extending slots 43 are distributed. As shown in FIG. 6, each of the slots 43 are oriented at an acute angle A with respect to the radially inward direction. In the preferred embodiment, the angle A is in the range of approximately 30° to 70°, and most preferably approximately 50°. As shown in FIG. 13, as a result of flowing radially inward through the air radial swirler the vitiated air 13' enters an annular passage 75 formed between the fuel gas radial swirler 41 and the air radial swirler 42 and is circumferentially swirled in the counter clockwise direction at angle A (looking with the direction of hot gas flow through the combustor 6). As shown in FIG. 4, a radially extending end wall 40 prevents the vitiated air 13' from flowing downstream directly into the combustion zone 92, thereby ensuring that all of the vitiated compressed air 13' that entered the air inlets 78 flows through the air radial swirler 42.

Figure 7:
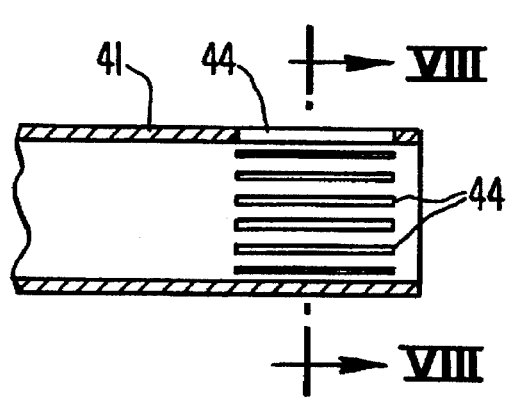
FIG. 7 is a longitudinal cross-section through the radial fuel swirler shown in FIG. 4.
Figure 8:
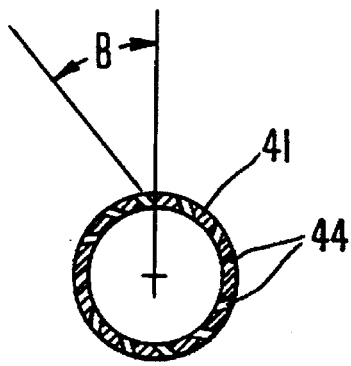
FIG. 8 is a cross-section taken through line VIII—VIII shown in FIG. 5.

After flowing through the annular passage 70 between the radial fuel swirler 41 and the fuel supply pipe 46, the fuel gas 15 from the gasifier 2 flows radially outward through the radial fuel swirler, as shown in FIG. 4. As shown in FIG. 7, the radial fuel swirler 41 is formed by a cylindrical member around which a plurality of axially extending slots 44 are distributed. As shown in FIG. 8, each of the slots 44 are oriented at an acute angle B with respect to the radially outward direction. In the preferred embodiment, the angle B is in the range of approximately 30° to 70°, and most preferably approximately 50° As shown in FIG. 13, as a result of flowing radially outward through the radial fuel swirler 41, the fuel gas 15 enters the annular passage 75 and is circumferentially swirled at angle B in the counter clockwise direction (looking with the direction of hot gas flow through the combustor 6). As a result of the swirling of both the fuel gas 15 and the vitiated compressed air 13', the fuel gas is rapidly and well mixed into the vitiated compressed air.

When supplemental high heating value fuel 18 is burned, either in addition to or instead of the fuel gas 15, it is directed to the fuel injection assembly 34 by the supply pipe 46. As shown best in FIGS. 9 and 10, the fuel supply pipe 46 encloses an electrode 64 for an igniter tip 67, forming an annular passage 71 therebetween. The high heating value fuel 18 flows through the annular passage 71 to a fuel nozzle 68. The fuel nozzle 68 is a disc shaped member in which a plurality of radially extending holes 69 are formed in a circular array. Thus, as shown in FIGS. 4 and 13, the fuel nozzle 68 causes the high heating value fuel 18 to enter the flow of vitiated air 13' proximate the outlet of the annular passage 75 by flowing radially outward into the swirling vitiated air. The igniter tip 67, which projects outward from a flat face 79 formed in the fuel nozzle 68, serves to ignite the fuel/air mixtures at start-up.

As shown in FIG. 4, the swirling fuel/air mixture formed by the fuel injection assembly 34 flows downstream through a passage formed by divergent conical domed section 39. The flow of the swirling fuel/air mixture through this diverging passage, together with the bluff body created by the flat face 79, creates an internal recirculation zone in which ignition occurs—that is, it creates a toroidal vortex 90 that recirculates flow in the forward end of the first combustion zone 92, as shown in FIG. 2.

Returning to FIG. 4, cooling air 20 is directed by cooling supply tubes 38, shown in FIG. 2, through holes 63 and into the cavity formed between the conical section 39 and the forward liner 30. The cooling air 20 may comprise a portion of the vitiated compressed air 13 or compressed air 10 bled directly from the compressor 1. The diverging conical section 39 is formed by concentric inner and outer cone sections 39' and 39", respectively, that form a narrow passage therebetween. The cooling air 20 flows through this passage, thereby cooling the inner section 39' and is then discharged into the first combustion zone 92.

According to an important aspect of the current invention, the flow rate of the vitiated compressed air 13' is regulated to maintain a rich fuel/air mixture in the first combustion zone—that is, the ratio of fuel gas 15 to vitiated air 13' is maintained above that associated with stoichiometric combustion. (Although for simplicity the following discussed is based on the use of only fuel gas 15, it should be understood that the discussion is also applicable to operation on only high heating value fuel 18 or a combination of both fuels 15 and 18.) In the preferred embodiment, an equivalence ratio of 1.2 to 1.4 is maintained in the first combustion zone 92—equivalence ratio being defined as the actual fuel/air ratio to the stoichiometric fuel/air ratio. As a result of the fuel rich nature of the fuel/air mixture, there is insufficient oxygen to combust all of the fuel gas 15 in the first combustion zone 92. However, the flow rate of vitiated compressed air 13' supplied to the first combustion zone 92 permits sufficient combustion to raise the temperature in the first combustion zone into approximately the 1400°–1600° C. (2600°–2900° F.) temperature range.

As a result of the fuel rich combustion in the first combustion zone 92, as much as 90% of the nitrogen bound in the fuel gas 15 as ammonia is converted to molecular nitrogen ($N_2$). However, due to the deficiency in oxygen, the nitrogen compounds in the fuel are not converted to NOx, even though the temperature is within the range that favors the formation of thermal NOx. Since the conversion of fuel bound nitrogen to molecular nitrogen requires not only the appropriate fuel/air ratio and temperature but also a certain amount of time, the length of the first combustion zone 92—that is, the axial distance from the fuel nozzle face 68 to the outlet of the annular passage 76—is set to provide the fuel gas 15 with the necessary residence time in the first combustion zone.

Since the important variable is the time the fuel gas 15 spends in the first combustion zone 92, not the length of its travel, the optimal length will depend on the velocity of the fuel/air mixture and, hence, will vary with the particular combustor application. Accordingly, in the preferred embodiment, the length of the first combustion zone 92 is set to achieve a residence time within it that is in the range of 25–50 milliseconds. Also, the recirculation at the forward end of the first combustion zone 92 that is created by the toroidal vortex 90, as previously discussed, as well as the steep rise in temperature and stable flame produced by the fuel injection system, further ensures adequate residence time for the conversion of the fuel bound nitrogen to molecular nitrogen.

As a result of variability in the coal gasification process carried out in the gasifier 2, the composition of the fuel gas 15 will vary over time. According to the current invention, to ensure adequate control over the conditions in the combustion process in the first combustion zone 92, the flow rate of the vitiated compressed air 13' is varied as a function of the heating value of the fuel gas 15.

Accordingly, as shown in FIG. 2, an apparatus 49 for sensing and determining the heating value of the fuel gas 15, such as an on-line gas chromatograph, is disposed in the fuel supply pipe 47. The heating value sensor 49 generates an electrical signal 95 that is transmitted to a controller 50, which may be microprocessor based. The controller 50 is programmed with logic, using techniques well known in the art, that causes it to generate a control signal 96 in response to the sensed heating value. The control signal 96 controls the operation of the driver 51 so as to automatically adjust the rotatable orifice plate 59, according to a predetermined calibration curve, to achieve the optimum flow rate of the vitiated compressed air 13' for the sensed fuel gas 15 heating value.

Alternatively, or in addition, the flow rate of the vitiated air 13' can be regulated as a function of variables other than fuel gas 15 heating value—for example, as a function of the power output from the turbine 7 or the fuel gas flow rate or the hot gas 16 temperature, as so to reduce the air flow rate at part load operation.

From the first combustion zone 92, the products of the fuel rich combustion that occurred therein, which includes CO and unburned hydrocarbons, flow into the second combustion zone 93. In the second combustion zone 93, additional vitiated compressed air 13" from the annular passage 76 is mixed into the combustion products. This mixing is aided by the swirl imparted to the vitiated air 13" by the axial swirler 76. The flow rate of vitiated compressed air 13" is such that a lean mixture of combustibles to vitiated air occurs in the second combustion zone—that is, the ratio of combustibles to air is less than that associated with stoichiometric combustion. In the preferred embodiment, the equivalence ratio in the second combustion zone is in the range of approximately 0.7 to 0.9. As a result of the excess oxygen, the combustion of CO and unburned hydrocarbons is essentially completed in the second combustion zone 93. The additional heat release raises the temperature in the second combustion zone 93 into approximately the 1500°–1650° C. (2800°–3000° F.) range.

Note that the temperature in the second combustion zone 93 is sufficiently high to promote the conversion of molecular nitrogen from the fuel gas 15 and the vitiated air to NOx. Therefore, the residence time in the second combustion zone 93 must be kept to the minimum necessary to complete the combustion of CO and unburned hydrocarbons. In the preferred embodiment, the length of the second combustion zone—that is, the distance between the outlets of the annular passages 76 and 77—is set so that the residence time is in the range of approximately 5–10 milliseconds.

From the second combustion zone 93, the products of the combustion that occurred therein flow to the quench zone 94. In this zone, additional vitiated compressed air 13''' from the annular passage 77 is mixed into the products of combustion so as to rapidly cool them to a temperature below that conducive to the formation of thermal NOx, thereby quenching the thermal NOx reaction. In this regard, the swirl imparted to the vitiated air 13''' by the axial swirler 82 further aids in the rapid mixing—and, therefore, the rapid quenching—of the products of combustion. In the preferred embodiment, the temperature in the quench zone 94 is below 1325° C. (2400° F.), although a higher quench temperature may be utilized if it is desired to operate the turbine 7 at higher temperatures. As a result of the additional excess air, the equivalence ratio in the quench zone 94 is approximately 0.3.

According to the current invention, the middle liner 32 has a circumferentially extending radially inward projection 87 that creates a converging/diverging passage 80 within the combustor 6 that forms the throat. The increase in hot gas velocity that occurs as a result of flowing through the throat 80 ensures that there will be no back flow of combustion products from the second combustion zone 93 into the first combustion zone 92. Such back flow of the lean fuel/air mixture from the second combustion zone 93 would increase the conversion of molecular nitrogen to NOx.

From the combustor 6, the quenched hot gas 16 is then directed to the turbine 7 for expansion, as previously discussed and as shown in FIG. 1.

Although the current invention has been described with reference to the combustion of a coal-derived fuel in a multiple annular swirl type combustor, the invention is also applicable to the burning of other fuels, such as fuels generated from biomass, in other types of combustors. In addition, although the current invention has been described with reference to a second generation pressurized fluidized bed combustion process in which vitiated air from the PFBC forms the combustion air, the invention is also applicable to other arrangements, such as an integrated gasified combined cycle power plant in which air from the compressor forms the combustion air. Accordingly, the current invention may be embodied in other specific forms without departing from the spirit or essential attributes thereof and, accordingly, reference should be made to the appended claims, rather than to the foregoing specification, as indicating the scope of the invention.

We claim:

1. A combustor for producing a hot compressed gas, said combustor having a longitudinal axis and comprising:

a) an air inlet for receiving a flow of compressed air; and
    b) means for mixing a flow of a first fuel into said flow of compressed air, thereby producing a fuel/air mixture, said fuel and air mixing means including:
        (i) first swirling means for directing said flow of said first fuel in a first direction, said first swirling means having a first orientation forming a first acute angle with respect to the longitudinal axis such that said first fuel is directed in a first radial direction, and
        (ii) second swirling means for directing said flow of compressed air in a second direction, said second swirling means having a second orientation forming a second acute angle with respect to the longitudinal axis such that said compressed air is directed in a second radial direction, said second radial direction being opposite said first radial direction, wherein said first and second acute angles are oriented with respect to said first and second radial directions, respectively, so as to swirl said flow of said first fuel and said flow of compressed air in a first circumferential direction.

2. The combustor according to claim 1, wherein said first radial direction is radially outward and said second radial direction is radially inward.

3. The combustor according to claim 1, wherein said first and second acute angles are each in the range of 30° to 70°.

4. The combustor according to claim 1, wherein said first swirling means comprises a first approximately cylindrical member having a plurality of first slots disposed therein, each of said first slots oriented at said first acute angle with said first radial direction.

5. The combustor according to claim 4, wherein said second swirling means comprises a second approximately cylindrical member having a plurality of second slots disposed therein, each of said second slots oriented at said second acute angle with said second radial direction.

6. The combustor according to claim 5, wherein said first and second slots are substantially axially extending and form a circumferential array of slots around said first and second members.

7. The combustor according to claim 5, wherein said second cylindrical member encircles said first cylindrical member.

8. The combustor according to claim 1, wherein said combustor has a cavity disposed therein that forms a combustion zone in which said fuel/air mixture is burned, and wherein said combustor further comprises means for creating recirculation through said combustion zone.

9. The combustor according to claim 8, wherein said recirculating means a diverging flow passage in flow communication with said fuel and air mixing means.

10. The combustor according to claim 8, wherein said recirculating means comprises a bluff body disposed axially upstream from said combustion zone.

11. The combustor according to claim 10, wherein said bluff body has a substantially flat surface facing toward said combustion zone.

12. The combustor according to claim 10, wherein said bluff body comprises means for introducing a flow of a second fuel into said combustion zone.

13. The combustor according to claim 12, wherein said second fuel has a higher heating value than said first fuel.

14. The combustor according to claim 12, wherein said second fuel introducing means comprises means for directing said second fuel in a substantially radial direction.

15. The combustor according to claim 14, wherein said means for directing said second fuel in a substantially radial direction comprises a circumferential array of radially outwardly extending passages.

16. The combustor according to claim 10, wherein said recirculating means further comprises a diverging flow passage disposed adjacent said bluff body.

17. The combustor according to claim 1, further comprising means for varying the flow rate of said flow of compressed air.

18. The combustor according to claim 17, wherein said means for varying said flow rate of said flow of compressed air comprises means responsive to the heating value of said first fuel, whereby said flow rate of said flow of compressed air is varied as a function of said heating value.

19. The combustor according to claim 17, wherein said air inlet has a flow area, and wherein said means for varying said flow rate of said flow of compressed air comprises means for varying said flow area of said air inlet.

* * * * *